(12) United States Patent
Yamagishi

(10) Patent No.: US 8,176,507 B2
(45) Date of Patent: May 8, 2012

(54) ADVERTISEMENT-SECTION DETECTING APPARATUS AND ADVERTISEMENT-SECTION DETECTING PROGRAM

(75) Inventor: Yoshikazu Yamagishi, Tokyo (JP)

(73) Assignee: Buffalo Inc., Nagoya (JP)

( * ) Notice: Subject to any disclaimer, the term of this patent is extended or adjusted under 35 U.S.C. 154(b) by 351 days.

(21) Appl. No.: 12/545,394

(22) Filed: Aug. 21, 2009

(65) Prior Publication Data

US 2010/0050203 A1 Feb. 25, 2010

(30) Foreign Application Priority Data

Aug. 21, 2008 (JP) .................................. 2008-213129

(51) Int. Cl.
*H04N 9/80* (2006.01)
*H04N 7/08* (2006.01)
*H04H 60/32* (2008.01)
(52) U.S. Cl. .......... 725/19; 725/137; 386/249; 386/250; 386/251
(58) Field of Classification Search ...................... 725/19
See application file for complete search history.

(56) References Cited

U.S. PATENT DOCUMENTS

| | | | |
|---|---|---|---|
| 6,771,885 B1* | 8/2004 | Agnihotri et al. | 386/314 |
| 2006/0236333 A1* | 10/2006 | Fujikawa et al. | 725/19 |
| 2008/0292272 A1* | 11/2008 | Yamazaki et al. | 386/95 |

FOREIGN PATENT DOCUMENTS

JP 2006-270299 10/2006

* cited by examiner

*Primary Examiner* — Justin Shepard
(74) *Attorney, Agent, or Firm* — Oblon, Spivak, McClelland, Maier & Neustadt, L.L.P.

(57) ABSTRACT

An advertisement-section detecting apparatus includes: a captioned-section acquisition unit (12) configured to acquire a captioned section including a caption generated by caption data, on the basis of a temporal position of the caption data; a non-captioned-section acquisition unit (13) configured to acquire a pattern of a non-captioned section that do not include the caption, on the basis of the captioned section; a memory (14) configured to store a broadcasting-program template which is a template corresponding to a broadcasting-program format including a main-section format and a peripheral-section format, and which is used for identifying a pattern of a non-captioned section format including the peripheral-section format; an identifying unit (15) configured to compare the pattern of the non-captioned section and the pattern of the non-captioned section format, and thus to identify the non-captioned section corresponding to the non-captioned section format; and a detector (16) configured to detect a section corresponding to the peripheral-section format as the peripheral section, from the non-captioned section corresponding to the non-captioned section format.

11 Claims, 8 Drawing Sheets

ADVERTISEMENT-SECTION DETECTING APPARATUS AND ADVERTISEMENT-SECTION DETECTING PROGRAM

CROSS REFERENCE TO RELATED APPLICATION

This application is based upon and claims the benefit of priority from the prior Japanese Patent Applications No. 2008-213129 filed on Aug. 21, 2008; the entire contents of which are incorporated herein by reference.

BACKGROUND OF THE INVENTION

1. Field of the Invention

The present invention relates to an advertisement-section detecting apparatus and an advertisement-section detecting program which detect peripheral sections on the basis of broadcast-data corresponding to a broadcasting program including main sections and the peripheral sections.

2. Description of the Related Art

There have heretofore been known techniques to broadcast broadcast-data corresponding to a broadcasting program including main sections and peripheral sections. The main sections include: main-content sections in which the main content of the broadcasting program is broadcast; and an opening-theme section in which the opening theme, such as the theme music and the cast lineup of the broadcasting program, is broadcast. The peripheral sections include advertisement sections in which commercial messages of the sponsors for the broadcasting program and other advertisements are broadcast.

In addition, in recent years, because of such circumstances as the start of the digital broadcasting service, an increasing number of pieces of broadcast-data have included not only audio data and video data but also caption data.

Under these circumstances, there is a need for a technique to detect the peripheral sections and thus to separate the main sections from the peripheral sections. In response to this need, there is proposed a technique in which the caption data included in the broadcast-data are used for detecting the peripheral sections (see, for example, Japanese Patent Application Publication No. 2006-270299).

Specifically, this technique uses the caption data included in the broadcast-data in order to detect the sections that include captions (hereafter, referred to as "captioned sections") and the sections that do not include captions (hereafter, referred to as "non-captioned sections"). Then, the length of each non-captioned section is compared with the lengths of the peripheral sections in order to detect the non-captioned sections corresponding to advertisement sections.

The above-described technique is no more than a simple comparison of the length of each non-captioned section with the lengths of the peripheral sections. Accordingly, if a main section includes a non-captioned section that is approximately as long as the peripheral sections, the section corresponding to the non-captioned section in the main section is detected as a peripheral section. For example, it is a common practice that the opening-theme section does not include captions, so that the opening-theme section is possibly detected as a peripheral section. Accordingly, the peripheral sections are detected with insufficient accuracy.

SUMMARY OF THE INVENTION

The present invention has been made to solve the above-mentioned problem, and an object thereof is to provide an advertisement-section detecting apparatus and an advertisement-section detecting program that are capable of detecting the peripheral sections with higher accuracy.

An advertisement-section detecting apparatus according to a first aspect detects a peripheral section on the basis of broadcast-data which corresponds to a broadcasting program including a main section and a peripheral section including an advertisement section, and which includes caption data. The advertisement-section detecting apparatus includes: a captioned-section acquisition unit configured to acquire a captioned section including a caption generated by the caption data, on the basis of a temporal position of the caption data; a non-captioned-section acquisition unit configured to acquire a pattern of the non-captioned section that do not include the caption, on the basis of the captioned section; a memory configured to store a broadcasting-program template which is a template corresponding to a broadcasting-program format including a main-section format and a peripheral-section format, and which is used for identifying a pattern of a non-captioned section format including the peripheral-section format; an identifying unit configured to compare the pattern of the non-captioned section and the pattern of the non-captioned section format, and thus to identify the non-captioned section corresponding to the non-captioned section format; and a detector configured to detect a section corresponding to the peripheral-section format as the peripheral section, from the non-captioned section corresponding to the non-captioned section format.

According to the first aspect, the memory stores the broadcasting-program template. The identifying unit compares the pattern of the non-captioned section and the pattern of the non-captioned section format, and thus to identify the non-captioned section corresponding to the non-captioned section format. The detector detects the section corresponding to the peripheral-section format as the peripheral section, from the non-captioned section corresponding to the non-captioned section format.

As described above, the peripheral sections are detected by using the broadcasting-program template stored in the memory. Thus, it is possible to detect the peripheral sections with higher accuracy than the case where a simple comparison is made between the length of each non-captioned section and the lengths of the peripheral sections.

In the first aspect, the pattern of the non-captioned section is a pattern representing at least both the order of the non-captioned section and the length of the non-captioned section within the broadcasting program. The pattern of the non-captioned section format is a pattern representing at least both the order of the non-captioned section format and the length of the non-captioned section format within the broadcasting-program format.

In the first aspect, the main-section format includes a main-content main-section format and a main-content peripheral-section format. The non-captioned section format includes the main-content peripheral-section format in addition to the peripheral-section format. The detector removes a section corresponding to the main-content peripheral-section format from the non-captioned section corresponding to the non-captioned section format, and thereby detects a section corresponding to the peripheral-section format as the peripheral section.

In the first aspect, the captioned-section acquisition unit acquires a section having a narrower distance between temporal positions of adjacent pieces of the caption data than a predetermined threshold as the captioned section.

In the first aspect, the captioned-section acquisition unit acquires a section having a predetermined length starting from temporal position of corresponding piece of the caption data as the captioned section.

An advertisement-section detecting program according to a second aspect detects peripheral section on the basis of broadcast-data which corresponds to a broadcasting program including a main section and a peripheral section including an advertisement section, and which includes caption data. The advertisement-section detecting program causing a computer to execute the steps of: (A) acquiring a captioned section including a caption generated by the caption data, on the basis of a temporal position of the caption data; (B) acquiring a pattern of a non-captioned section that do not include the caption, on the basis of the captioned section; (C) reading a broadcasting-program template which is a template corresponding to a broadcasting-program format including a main-section format and a peripheral-section format, and which is used for identifying a pattern of a non-captioned section format including the peripheral-section format; (D) comparing the pattern of the non-captioned section and the pattern of the non-captioned section format, and thereby identifying the non-captioned section corresponding to the non-captioned section format; and (E) detecting a section corresponding to the peripheral-section format as the peripheral section, from the non-captioned section corresponding to the non-captioned section format.

In the second aspect, the pattern of the non-captioned section is a pattern representing at least both the order of the non-captioned section and the length of the non-captioned section within the broadcasting program. The pattern of the non-captioned section format is a pattern representing at least both the order of the non-captioned section format and the length of the non-captioned section format within the broadcasting-program format.

In the second aspect, the main-section format includes a main-content main-section format and a main-content peripheral-section format. The non-captioned section format includes the main-content peripheral-section format in addition to the peripheral-section format. At the step (E), a section corresponding to the main-content peripheral-section format is removed from the non-captioned section corresponding to the non-captioned section format, and thereby a section corresponding to the peripheral-section format is detected as the peripheral section.

In the second aspect, at the step (A), a section having a narrower distance between temporal positions of adjacent pieces of the caption data than a predetermined threshold is acquired as the captioned section.

In the second aspect, at the step (A), a section having a predetermined length starting from temporal position of corresponding piece of the caption data is acquired as the captioned section.

According to the present invention, it is possible to provide an advertisement-section detecting apparatus and an advertisement-section detecting program that are capable of detecting the peripheral sections with higher accuracy.

DESCRIPTION OF THE EMBODIMENTS

Figure 1:
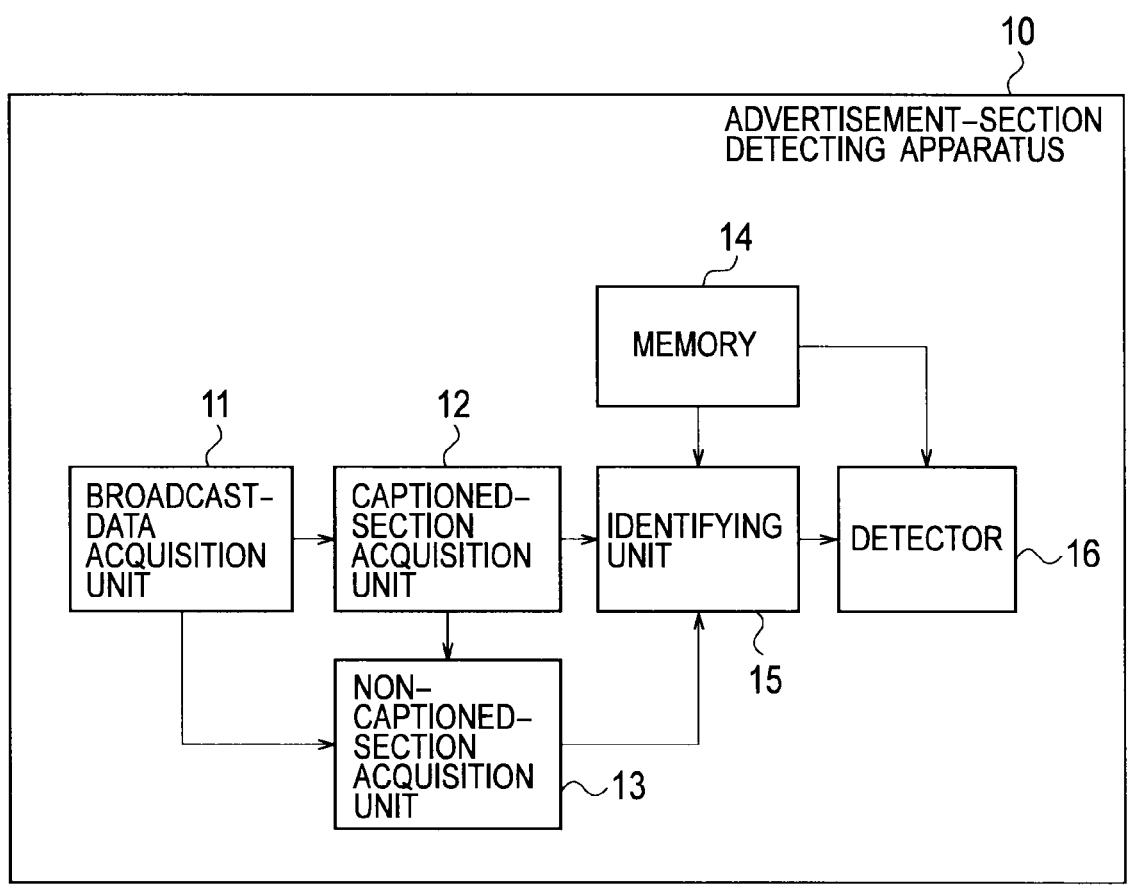
FIG. 1 is a block diagram illustrating an advertisement-section detecting apparatus 10 according to a first embodiment.

An advertisement-section detecting apparatus according to some embodiments of the present invention will be described below by referring to the drawings. In the drawings, identical or similar portions are denoted by identical or similar reference numerals.

It should be noted that the drawings are all schematic and that proportions and the like of dimensions are different from actual ones. Thus, specific dimensions and the like should be determined with the description below taken into consideration. Additionally, these drawings include portions where relations or proportions of dimensions are different therebetween.

First Embodiment (Configuration of Advertisement-Section Detecting Apparatus)

An advertisement-section detecting apparatus according to a first embodiment will be described below by referring to the drawings. FIG. 1 is a block diagram illustrating an advertisement-section detecting apparatus 10 according to the first embodiment.

As FIG. 1 shows, the advertisement-section detecting apparatus 10 includes a broadcast-data acquisition unit 11, a captioned-section acquisition unit 12, a non-captioned-section acquisition unit 13, a memory 14, an identifying unit 15, and a detector 16.

The broadcast-data acquisition unit 11 acquires a piece of broadcast-data that includes at least caption data. The piece of broadcast-data corresponds to a broadcasting program that includes main sections and peripheral sections. The broadcast-data include not only the caption data but also audio data or video data. The broadcast-data may include both audio data and video data.

Note that the following description of the first embodiment is given by taking, as the broadcasting program corresponding to the piece of broadcast-data, a broadcasting-program series (e.g. a drama series) that is broadcast regularly.

Figure 2:
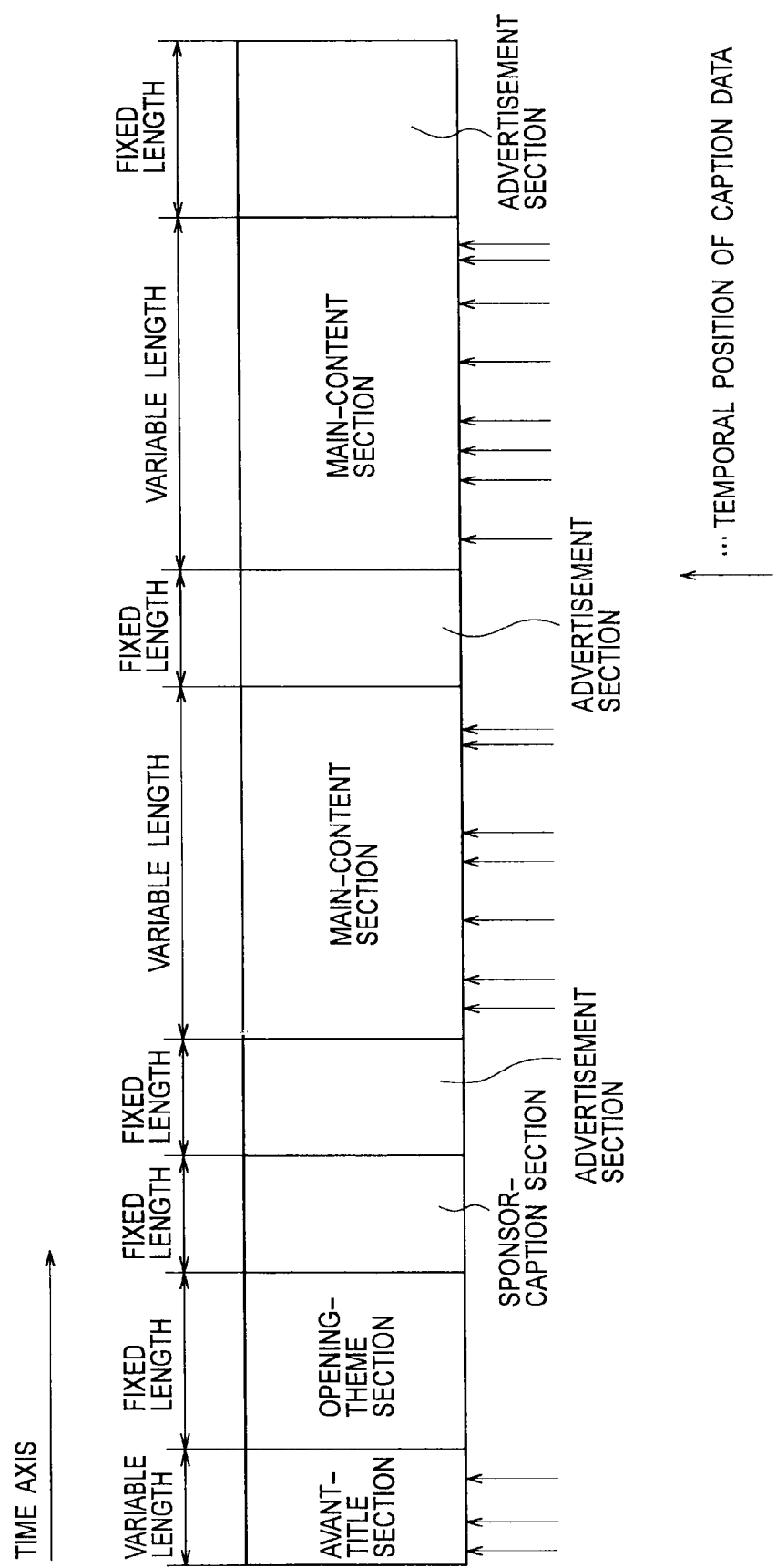
FIG. 2 is a diagram illustrating a piece of broadcast-data according to the first embodiment.

Herein, the piece of broadcast-data includes pieces of data corresponding to main sections and those corresponding to the peripheral sections. The main sections include main-content main sections and main-content peripheral sections. The main-content main sections include an avant-title section, main-content sections, a trailer section, and the like. In FIG. 2, an avant-title section and main-content sections are shown as examples of the main-content main sections. The main-content peripheral sections include an opening-theme section, an ending-theme section, a broadcasting-program announcement section, and the like. In FIG. 2, an opening-theme section is shown as an example of the main-content peripheral sections.

The peripheral sections include sponsor-caption sections, advertisement sections, and the like. In FIG. 2, a sponsor-caption section and advertisement sections are shown as examples of the peripheral sections.

<<Main-Content Main Sections>>

In the avant-title section, which precedes the main content of the broadcasting program, an introductory part of the main content of the broadcasting program is broadcast. The broadcasting of the avant-title section is accompanied by captions. That is, the piece of broadcast-data for the avant-title sections includes caption data. The length of the avant-title section may vary from one episode of the broadcasting-program series to another. To put it differently, the avant-title section has a variable length.

In the main-content sections, main content of the broadcasting program is broadcast. The broadcasting of the main-content sections is accompanied by captions. That is, the pieces of broadcast-data for the main-content sections include caption data. The length of each main-content section may vary from one episode of the broadcasting-program series to another. To put it differently, each main-content section has a variable length.

In the trailer section, the announcement for the main content of the next episode is broadcast. The broadcasting of the trailer section is accompanied by captions. That is, the piece of broadcast-data for the trailer section includes caption data. The length of the trailer section may vary from one episode of the broadcasting-program series to another. To put it differently, the trailer section has a variable length.

<<Main-Content Peripheral Sections>>

In the opening-theme section, the opening theme, including the theme music and the cast lineup, of the broadcasting program is broadcast. The broadcasting of the opening-theme section is not accompanied by captions. That is, the piece of broadcast-data for the opening-theme section does not include caption data. The length of the opening-theme section does not vary from one episode of the broadcasting-program series to another. To put it differently, the opening-theme section has a fixed length.

In the ending-theme section, the ending theme, including the theme music and the cast lineup, of the broadcasting program is broadcast. The broadcasting of the ending-theme section is not accompanied by captions. That is, the piece of broadcast-data for the ending-theme section does not include caption data. The length of the ending-theme section does not vary from one episode of the broadcasting-program series to another. To put it differently, the ending-theme section has a fixed length.

In each of the broadcasting-program announcement sections, the announcement of the main content that follows the announcement is broadcast. The broadcasting of each broadcasting-program announcement section is not accompanied by captions. That is, the piece of broadcast-data for each broadcasting-program announcement section does not include caption data. The length of each broadcasting-program announcement section does not vary from one episode of the broadcasting-program series to another. To put it differently, each of the broadcasting-program announcement sections has a fixed length.

<<Peripheral Sections>>

In each of the sponsor-caption sections, the caption to introduce the sponsors of the broadcasting program is broadcast. The broadcasting of each sponsor-caption section is not accompanied by captions. That is, the piece of broadcast-data for each sponsor-caption section does not include caption data. The total length of sponsor-caption sections does not vary from one episode of the broadcasting-program series to another. To put it differently, sponsor-caption sections, as a whole, have a fixed length. Note that each sponsor-caption section may form either a part of one of the main sections or a part of one of the peripheral sections.

Specifically, the total length of the sponsor-caption sections included in each episode of the broadcasting-program series does not vary from one episode of the broadcasting-program series to another. In addition, it is a common practice that the number of sponsor-caption sections included in each episode of the broadcasting-program series does not vary from one episode of the broadcasting-program series to another. On the other hand, the length of each of the sponsor-caption sections included in a single episode of the broadcasting-program series may vary from one section to another. To put it differently, each of the sponsor-caption sections included in the broadcasting-program series can be defined by the order of the sponsor-caption sections and the lengths of the sponsor-caption sections, and it is a common practice that the total length of the sponsor-caption sections does not vary from one episode of the broadcasting-program series to another.

In each of the advertisement sections, commercial messages of the sponsors for the broadcasting program and other advertisements are broadcast. The broadcasting of each advertisement section is not accompanied by captions. That is, the pieces of broadcast-data for the advertisement sections do not include caption data. The total length of advertisement sections does not vary from one episode of the broadcasting-program series to another. To put it differently, the advertisement sections, as a whole, have a fixed length.

Specifically, the total length of the advertisement sections included in each episode of the broadcasting-program series does not vary from one episode of the broadcasting-program series to another. In addition, it is a common practice that the number of advertisement sections included in each episode of the broadcasting-program series does not vary from one episode of the broadcasting-program series to another. On the other hand, the length of each advertisement section included in each episode of the broadcasting-program series may vary from one section to another. To put it differently, each of the advertisement sections included in the broadcasting-program series can be defined by the order of the advertisement sections and the lengths of the advertisement sections, and it is a common practice that the total length of the advertisement sections does not vary from one episode of the broadcasting-program series to another.

Note that the "temporal position of caption data" mentioned in FIG. 2 refers to a temporal position on the time axis at which each piece of caption data is included in the piece of broadcast-data (broadcasting program). For example, each "temporal position of caption data" is defined by the time elapsed since the start of the piece of broadcast-data (broadcasting program).

In the first embodiment, the "time axis" refers to a time axis representing the playback time of the broadcasting program that is reproduced by the piece of broadcast-data. That is, the "time axis" refers to a time axis representing the time when the viewers watch the broadcasting program that is reproduced at the normal speed. Accordingly, it should be noted that the "time axis" does not depend on the order of receiving the various pieces of broadcast-data. In addition, the "temporal position" may be considered as a time elapsed since the start of a certain viewer's watching the broadcasting program reproduced at the normal speed.

Now, refer back to FIG. 1. The captioned-section acquisition unit 12 acquires captioned sections including captions generated by the caption data, on the basis of the temporal positions of various pieces of caption data. The broadcasting of each piece of captions generated by the corresponding piece of caption data starts at the temporal position of the corresponding piece of caption data. Needless to say, the length of each of the sections with captions may vary depending on the amount of captions to be broadcast.

Two exemplar methods by which the captioned-section acquisition unit 12 acquires the captioned sections will be described below.

Figure 3:
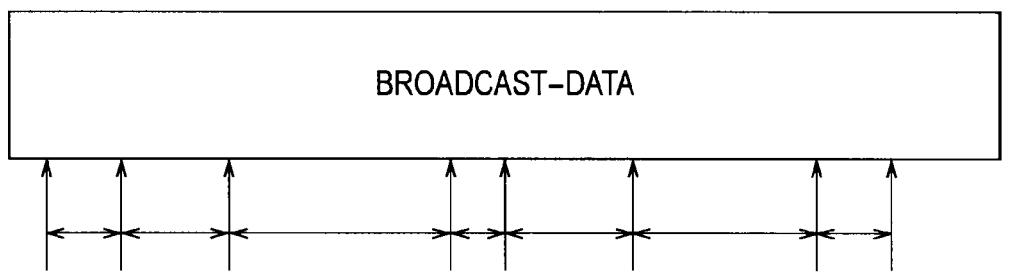
FIG. 3 is a diagram describing a method of acquiring captioned sections according to the first embodiment.
Figure 3:
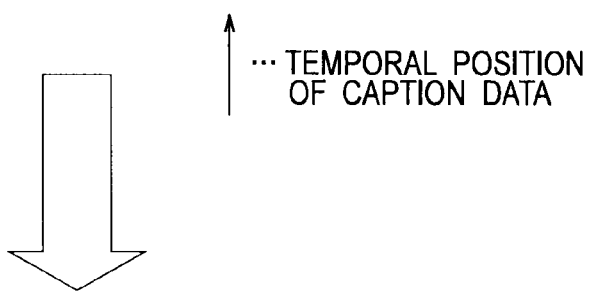
Figure 3:
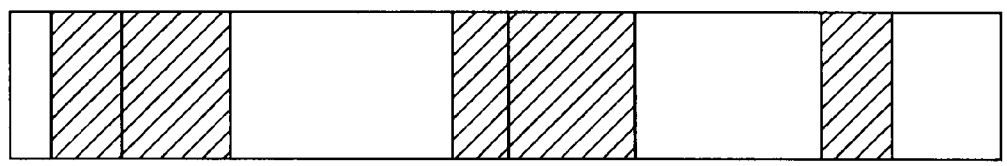
Figure 3:
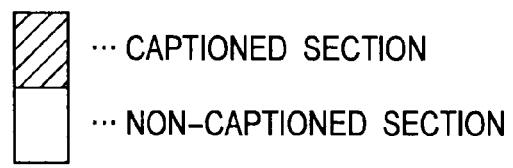

Firstly, a first acquisition method will be described by referring to FIG. 3. As FIG. 3 shows, each of the sections acquired by the captioned-section acquisition unit 12 as captioned sections has a narrower distance between two adjacent temporal positions of caption data than a predetermined threshold. Note that, if the ending position of one captioned section is coincided with the starting position of the other captioned section, the one captioned section and the other captioned section may be combined together to form a single captioned section. The starting positions and the ending positions of captioned sections are temporal positions on the time axis. For example, each of the starting positions and the ending positions of captioned sections can be defined by the time elapsed since the start of the piece of broadcast-data (broadcasting program).

Figure 4:
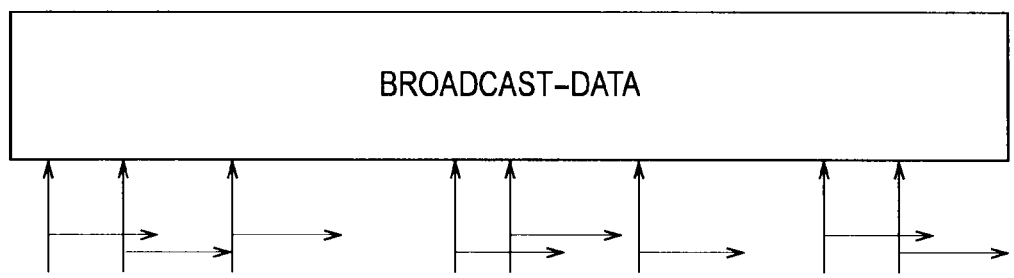
FIG. 4 is a diagram describing a method of acquiring captioned sections according to the first embodiment.
Figure 4:
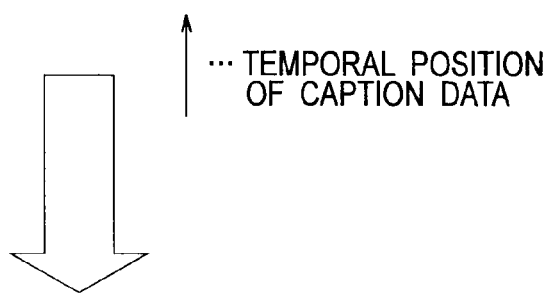
Figure 4:
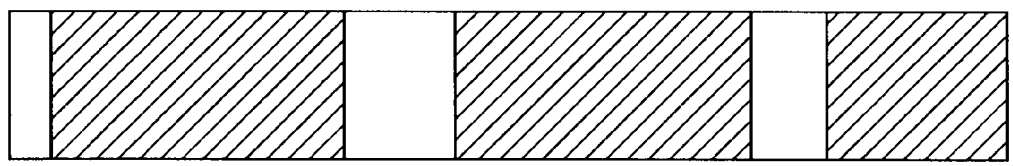
Figure 4:
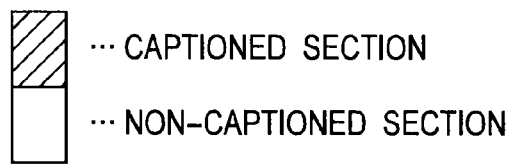

Secondly, a second acquisition method will be described by referring to FIG. 4. As FIG. 4 shows, each of the sections acquired by the captioned-section acquisition unit 12 as captioned sections starts from each temporal position of caption data and has a predetermined length. Note that, if one captioned section and the other captioned section have a overlapping part, the one captioned section and the other captioned section may be combined together to form a single captioned section. Note also that the predetermined length of each section may vary depending on the amount of each piece of caption data. For example, if the piece of caption data has a large amount, the length of the section corresponding to the piece of caption data is set to be longer. Conversely, if the piece of caption data has a small amount, the length of the section corresponding to the piece of caption data is set to be shorter.

Now, refer back to FIG. 1. On the basis of the captioned sections identified by the captioned-section acquisition unit 12, the non-captioned-section acquisition unit 13 acquires a pattern of non-captioned sections which do not include captions generated by pieces of caption data. For example, the pattern of non-captioned sections represents the order of the non-captioned sections and the lengths of the non-captioned sections within the broadcasting program.

In the first embodiment, the pattern of non-captioned sections is expressed by: the starting position of each non-captioned section; the ending position of each non-captioned section; and the length of each non-captioned section. The starting positions and the ending positions of the non-captioned sections are temporal positions on the time axis. For example, each of the starting position and the ending position of each non-captioned section can be defined by the time elapsed since the start of the piece of broadcast-data (broadcasting program).

Specifically, the sections identified by the non-captioned-section acquisition unit 13 as non-captioned sections are those sections that are not captioned sections. In this way the non-captioned-section acquisition unit 13 acquires: the starting position of each non-captioned section; the ending position of each non-captioned section; and the length of each non-captioned section.

The memory 14 stores a broadcasting-program template corresponding to a broadcasting-program format including a main-section format and a peripheral-section format. The broadcasting-program template is a template used for identifying the pattern of non-captioned section formats including peripheral-section formats. For example, the pattern of non-captioned section format is a pattern representing the order of the non-captioned section formats and the length of the non-captioned section formats within the broadcasting-program format.

Note that, the description of the first embodiment will be given by taking a broadcasting-program series (e.g. a drama series) that is broadcast regularly as the broadcasting-program format corresponding to the broadcasting-program template.

The broadcasting-program template mentioned above is a template corresponding to a broadcasting-program format including main-section formats and peripheral-section formats. Note that, the broadcasting-program template does not have to include a captioned section format as long as the order of the non-captioned section formats and the lengths of the non-captioned section formats can be identified.

The main-section formats are formats corresponding to main sections. The main-section formats include such formats as the avant-title-section format, the main-content-section format, the trailer-section format, the opening-theme-section format, the ending-theme-section format, the broadcasting-program announcement-section format. The peripheral-section formats are formats corresponding to peripheral sections. The peripheral-section formats include such formats as the sponsor-caption-section format and the advertisement-section format.

Figure 5:
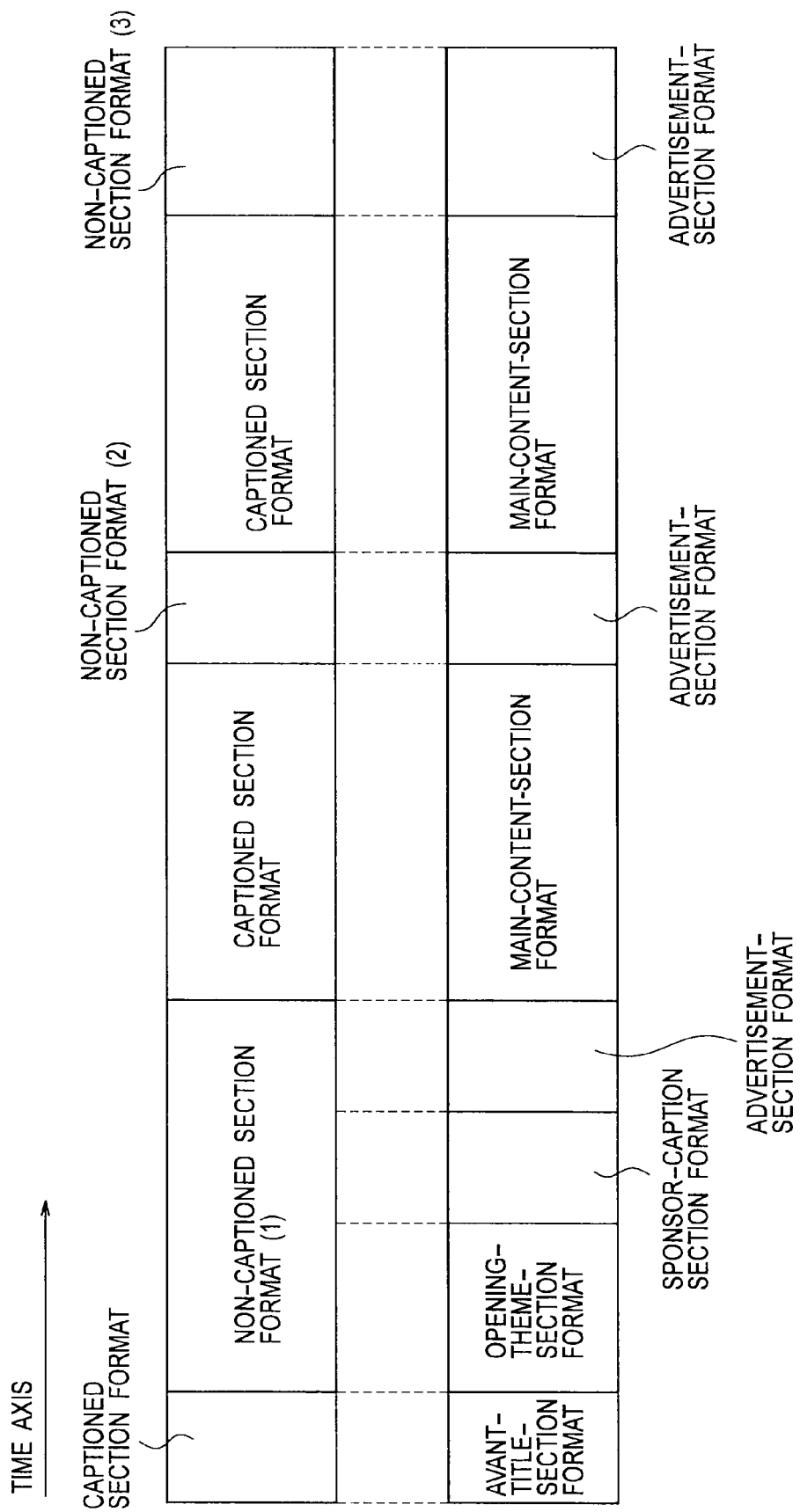
FIG. 5 is a diagram illustrating a broadcasting-program template according to the first embodiment.

In the example shown in FIG. 5, the broadcasting-program template is divided into the avant-title-section format, the opening-theme-section format, the sponsor-caption-section format, the advertisement-section formats, the main-content-section formats, and the like. The avant-title-section format and the main-content-section formats are included in the captioned section formats. The opening-theme-section format, the sponsor-caption-section format, and the advertisement-section formats are included in the non-captioned section formats.

Note that, if the non-captioned section formats include not only the peripheral-section formats but also other formats, the broadcasting-program template identifies the starting position and the ending position of each peripheral-section format within the non-captioned section formats. The starting position and the ending position of each peripheral-section format are temporal positions on the time axis. For example, each of the starting position and the ending position of each peripheral-section format can be defined by the time elapsed since the start of the non-captioned section format including the peripheral-section format.

The identifying unit 15 compares the pattern of the non-captioned sections and the pattern of the non-captioned section formats, and thus identifies non-captioned sections corresponding respectively to the non-captioned section formats.

Figure 6:
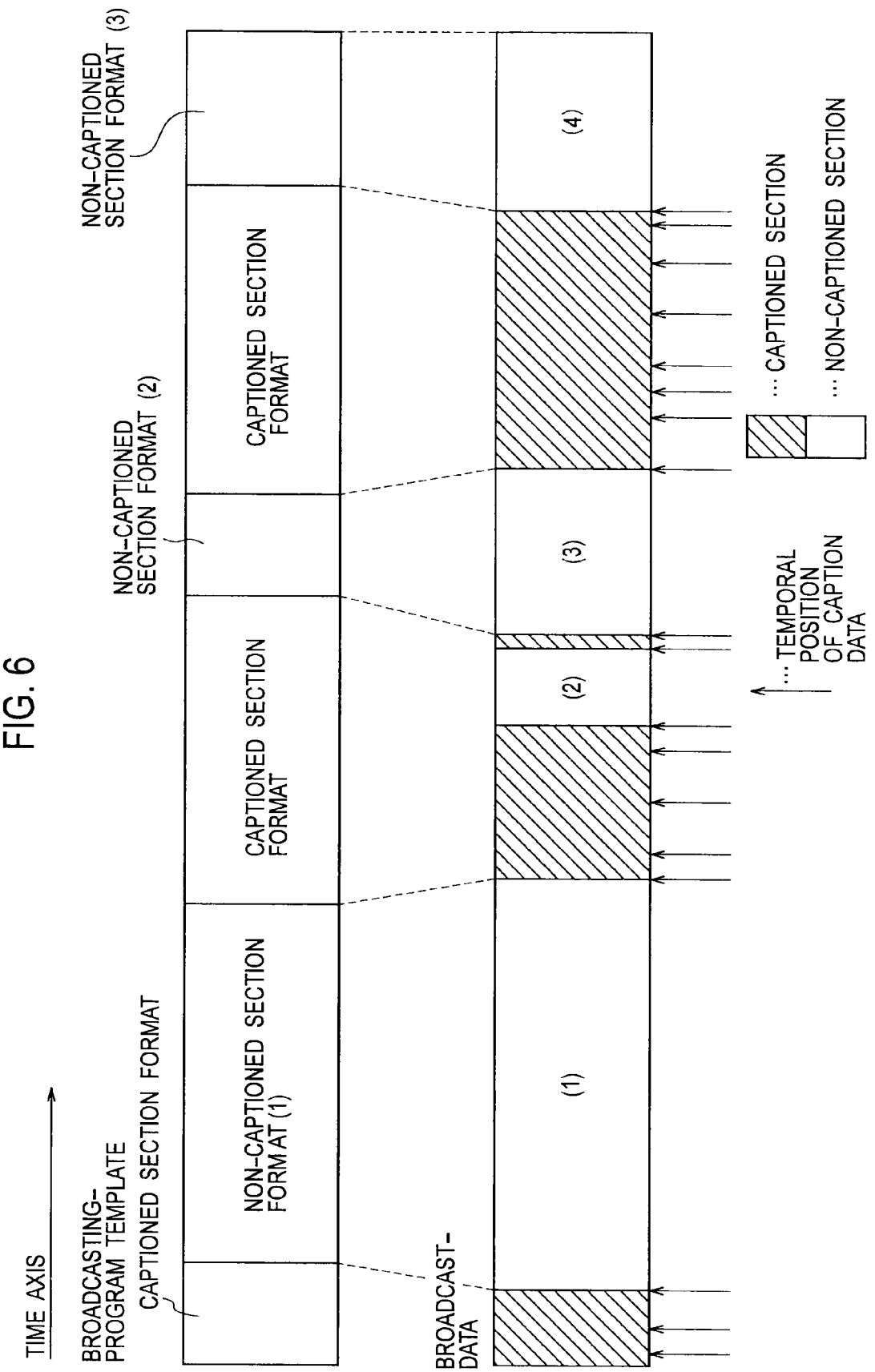
FIG. 6 is a diagram describing a method of identifying non-captioned sections according to the first embodiment.

For example, suppose a case such as one shown in FIG. 6, where the broadcasting-program template includes a non-captioned section format (1) to a non-captioned section format (3), and, at the same time, where the piece of broadcast-data includes a non-captioned section (1) to a non-captioned section (4).

Firstly, the identifying unit 15 searches the piece of broadcast-data from the start thereof along the time axis to find non-captioned sections each of which is longer than the non-captioned section format (1). In this case, the non-captioned section (1) is found out as a non-captioned section that is longer than the non-captioned section format (1). The identifying unit 15, then, identifies the non-captioned section (1) as a non-captioned section corresponding to the non-captioned section format (1).

Secondly, the identifying unit 15 searches the piece of broadcast-data from the end position of the non-captioned section (1) along the time axis to find non-captioned sections each of which is longer than the non-captioned section format (2). In this case, the non-captioned section (2) is shorter than the non-captioned section format (2), so that the non-captioned section (2) is not found out as a non-captioned section that is longer than the non-captioned section format (2). Instead, the non-captioned section (3) is found out as a non-captioned section that is longer than the non-captioned section format (2). The identifying unit 15, then, identifies the non-captioned section (3) as the non-captioned section corresponding to the non-captioned section format (2).

Thirdly, the identifying unit 15 searches the piece of broadcast-data from the end position of the non-captioned section (3) along the time axis to find non-captioned sections each of which is longer than the non-captioned section format (3). In this case, the non-captioned section (4) is found out as a non-captioned section that is longer than the non-captioned section format (3). The identifying unit 15, then, identifies the non-captioned section (4) as the non-captioned section corresponding to the non-captioned section format (3).

Now, refer back to FIG. 1. From the non-captioned sections identified by the identifying unit 15, the detector 16 detects, as peripheral sections, sections that correspond respectively to peripheral-section formats.

Firstly, suppose a case where the non-captioned section formats include only the peripheral-section formats (e.g. sponsor-caption-section formats, and advertisement-section formats). From the non-captioned sections identified by the identifying unit 15, the detector 16, then, identifies sections each of which has a length equal to the length of a peripheral-section format. For example, the detector 16 may identify sections having a length that is equal to the length of a peripheral-section format by shifting the start position of each of such sections to the start position of the non-captioned section. The detector 16 may identify sections having a length that is equal to the length of a peripheral-section format by shifting the end position of each of such sections to the end position of the non-captioned section. The detector 16 may identify the sections having a length that is equal to the length of the peripheral-section format by shifting the weighted-average temporal position of each of such non-captioned sections to the weighted-average temporal position of the peripheral-section format. The weighted-average temporal position of each non-captioned section is a temporal position representing a certain proportion to the length of the non-captioned section. For example, the weighted-average temporal position is the temporal position at which the non-captioned section is divided into two parts in the proportion of 30:70. Likewise, the weighted-average temporal position of the peripheral-section format is a temporal position representing a certain proportion to the length of the peripheral-section format. For example, the weighted-average temporal position is the temporal position at which the peripheral-section format is divided into two parts in the proportion of 30:70. The detector 16 detects the identified sections as the peripheral sections.

Secondly, suppose a case where the non-captioned section formats include not only the peripheral-section formats (e.g. sponsor-caption-section formats, and advertisement-section formats) but also other formats. An example of such a case is shown in FIG. 5, in which the opening-theme-section format is included in the non-captioned section formats. From the non-captioned sections identified by the identifying unit 15, the detector 16 identifies the sections that correspond respectively to the peripheral-section formats. The identification performed by the detector 16 is based on the starting position and the ending position of each peripheral-section format within each non-captioned section format. For example, the detector 16 removes a section that corresponds to the opening-theme-section format from the non-captioned sections identified by the identifying unit 15. The detector 16 may remove sections that correspond respectively to sponsor-caption-section formats from the non-captioned sections identified by the identifying unit 15.

(Operation of Advertisement-Section Detecting Apparatus)

Figure 7:
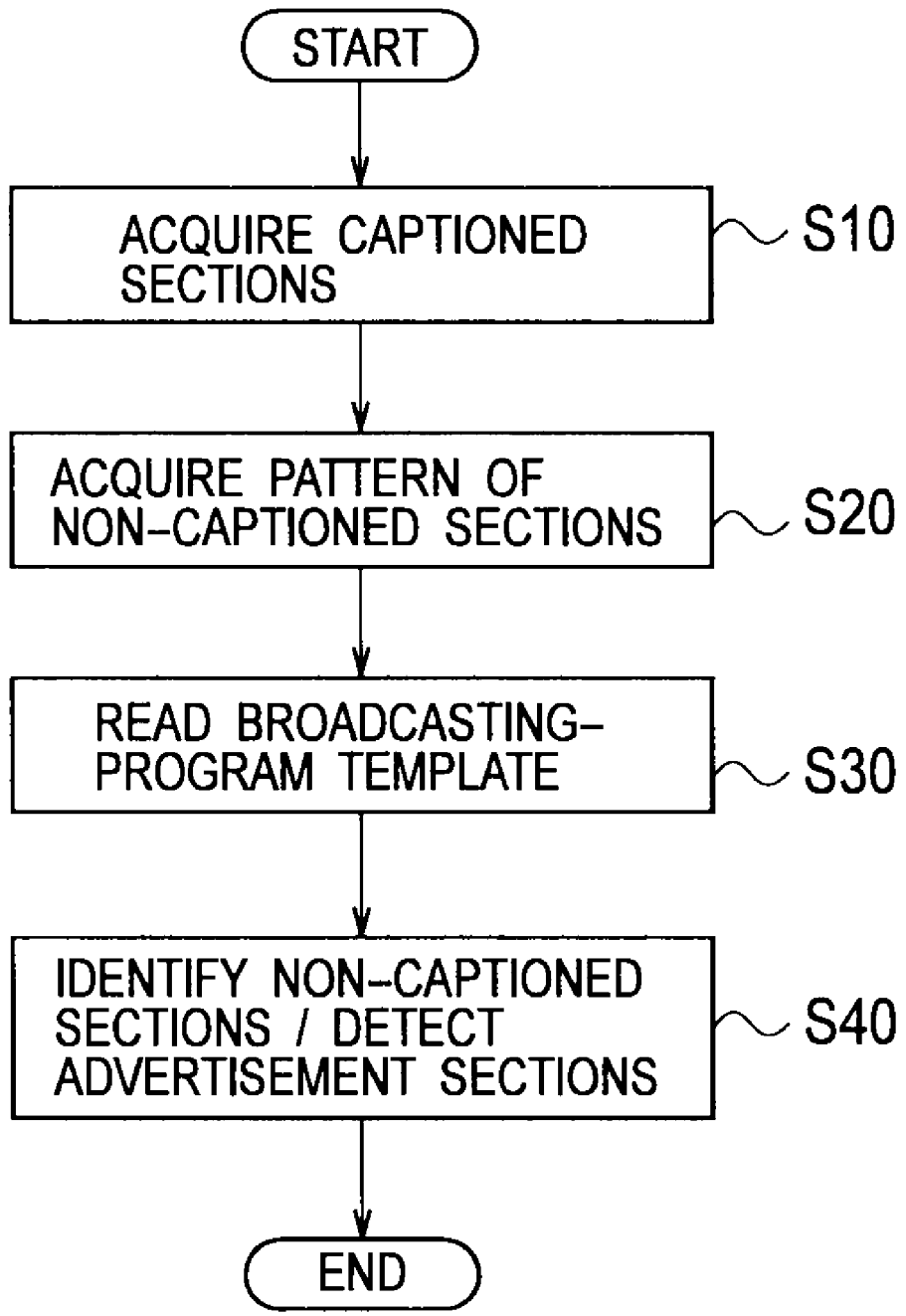
FIG. 7 is a flowchart illustrating the operation of the advertisement-section detecting apparatus 10 according to the first embodiment.
Figure 8:
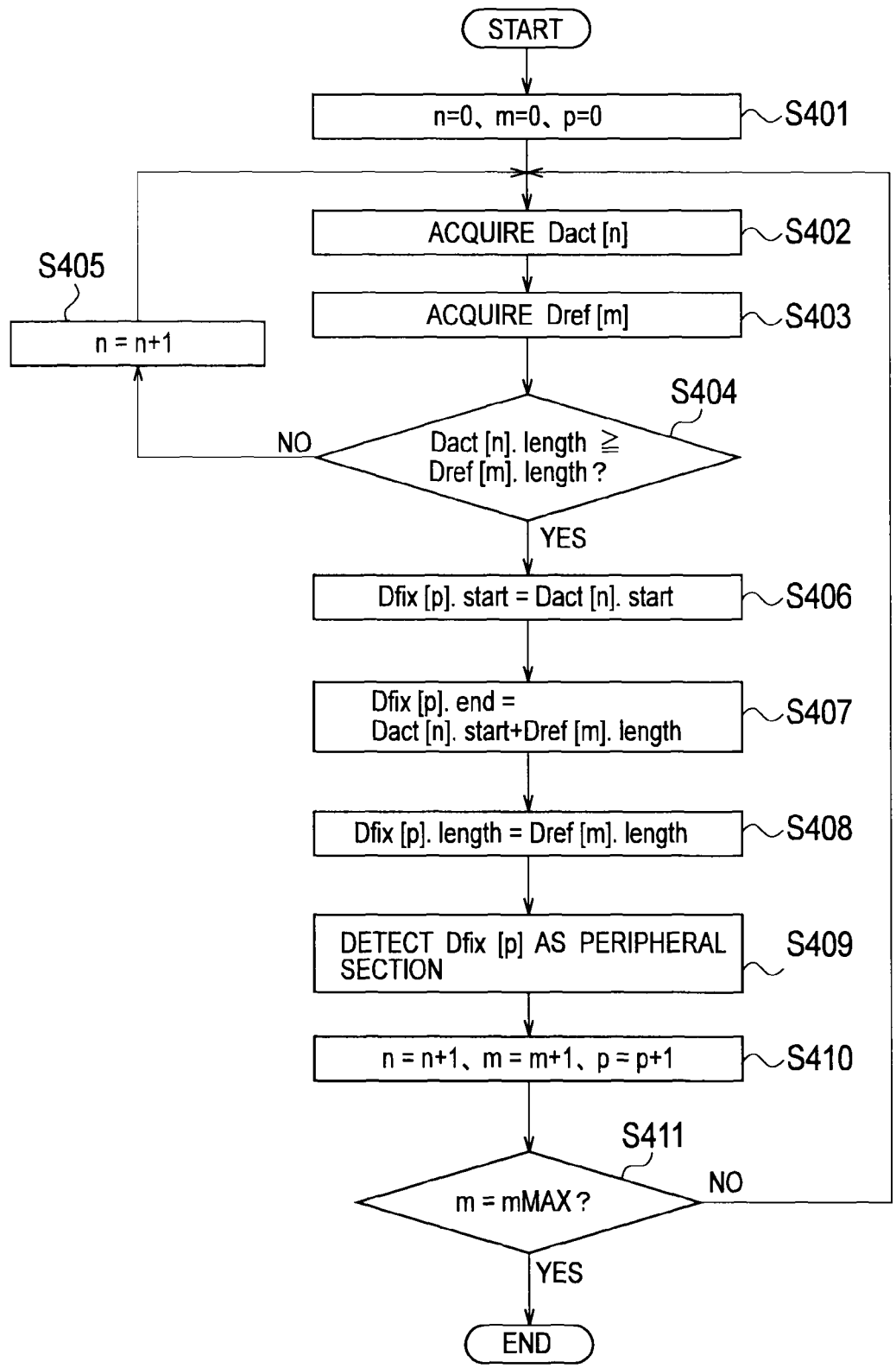
FIG. 8 is a flowchart illustrating the operation of the advertisement-section detecting apparatus 10 according to the first embodiment.

The operation of the advertisement-section detecting apparatus according to the first embodiment will be described below by referring to the drawings. FIG. 7 and FIG. 8 are flowcharts illustrating the operation of the advertisement-section detecting apparatus 10 according to the first embodiment.

As FIG. 7 shows, at step S10, on the basis of the temporal positions of pieces of caption data, the advertisement-section detecting apparatus 10 acquires captioned sections including captions generated by the pieces of caption data.

At step S20, on the basis of the captioned sections acquired at step S10, the advertisement-section detecting apparatus 10 acquires the pattern of non-captioned sections, which do not include captions generated by the pieces of caption data.

At step S30, the advertisement-section detecting apparatus 10 reads the broadcasting-program template corresponding to the broadcasting-program format including captioned section formats and non-captioned section formats. The broadcasting-program template is a template that is used for identifying the pattern of the non-captioned section formats including the peripheral-section formats.

At step S40, the advertisement-section detecting apparatus 10 compares the pattern of the non-captioned sections and the pattern of the non-captioned section formats, and thus identifies the non-captioned sections corresponding respectively to non-captioned section formats. From the non-captioned sections corresponding respectively to the non-captioned section formats, the advertisement-section detecting apparatus 10, then, detects, as the peripheral sections, the sections that correspond respectively to the peripheral-section formats.

Details of the process executed at step S40 will be described below by referring to FIG. 8. In FIG. 8, the value Dact[n] is a value indicating the non-captioned sections acquired at step S20. The value [n] represents a value indicating the order of the non-captioned sections, and is an integer within a range $0 \leq n \leq nMAX$. It should be noted that the closer a certain non-captioned section is to the start of the piece of broadcast-data, the smaller the value [n] becomes. The value Dact[n].length represents a value indicating the length of the non-captioned section. The value Dact[n].start represents a value indicating the starting position of the non-captioned section.

The value Dref[m] represents a value indicating the non-captioned section formats read at step S30. The value [m] represents a value indicating the order of the non-captioned section formats, and is an integer within a range $0 \leq m \leq mMAX$ (<nMAX). It should be noted that the closer a certain non-captioned section format is to the start of the broadcasting-program format, the smaller the value [m] becomes. The value Dref[m].length represents a value indicating the length of the non-captioned section format.

The value Dfix[p] represents a value indicating the peripheral sections detected by the advertisement-section detecting apparatus 10. The value [p] represents a value indicating the order of the peripheral sections, and is an integer within a range $0 \leq p \leq pMAX$ (=mMAX). It should be noted that the closer a certain peripheral section is to the start of the piece of broadcast-data, the smaller the value [p] becomes. The value Dfix[p].length represents a value indicating the length of the peripheral section. The value Dfix[p].start represents a value indicating the starting position of the peripheral section. The value Dfix[p].end represents a value indicating the ending position of the peripheral section.

As FIG. 8 shows, at step S401, the advertisement-section detecting apparatus 10 sets all the values "n", "m", and "p" at "0".

At step S402, the advertisement-section detecting apparatus 10 acquires the value Dact[n]. Specifically, the advertisement-section detecting apparatus 10 acquires the value Dact[n].length and the value Dact[n].start.

At step S403, the advertisement-section detecting apparatus 10 acquires the value Dref[m]. Specifically, the advertisement-section detecting apparatus 10 acquires the value Dref[m].length.

At step S404, the advertisement-section detecting apparatus 10 determines whether or not the relationship Dact[n].length≧Dref[m].length is satisfied. If the relationship Dact[n].length≧kDref[m].length is satisfied, the advertisement-section detecting apparatus 10 proceeds to execute the process of step S406. If, conversely, the relationship Dact[n].length≧Dref[m].length is not satisfied, the advertisement-section detecting apparatus 10 proceeds to execute the process of step S405.

At step S405, the advertisement-section detecting apparatus 10 adds "1" to the value "n".

At step S406, the advertisement-section detecting apparatus 10 sets the value Dact[n].start at the value Dfix[p].start.

At step S407, the advertisement-section detecting apparatus 10 sets the value Dact[n].start+Dref[m].length at the value Dfix[p].end.

At step S408, the advertisement-section detecting apparatus 10 sets the value Dref[m].length at the value Dfix[p].length.

At step S409, the advertisement-section detecting apparatus 10 detects the value Dfix[p] as the peripheral section. Note that the value Dfix[p] is defined by the value Dfix[p].start, the value Dfix[p].end, and the value Dfix[p].length.

At step S410, the advertisement-section detecting apparatus 10 adds "1" to each of the values "n", "m", and "p".

At step S411, the advertisement-section detecting apparatus 10 determines whether or not the value "m" is the value "mMAX". If the value "m" is the value "mMAX", the advertisement-section detecting apparatus 10 terminates the series of processes. If the value "m" does not reach the value "mMAX", the advertisement-section detecting apparatus 10 proceeds back to the process of step S402.

Note that, at step S406 to step S409 in FIG. 8, the advertisement-section detecting apparatus 10 detects the sections having a length that is equal to the length of the peripheral-section format as peripheral sections by shifting the start of each of such sections to the start of the corresponding non-captioned section. However, as described above, this embodiment is not limited to this series of processes. The advertisement-section detecting apparatus 10 may detect, as peripheral sections, the sections that correspond respectively to the peripheral-section formats by removing the section corresponding to the opening-theme-section format from the non-captioned sections identified by the identifying unit 15.

(Advantageous Effects)

In the first embodiment, the memory 14 stores the broadcasting-program template used for identifying the pattern of the non-captioned section formats including the peripheral-section formats. The identifying unit 15 compares the pattern of the non-captioned sections with the pattern of the non-captioned section formats, and thus identifies the non-captioned sections corresponding respectively to the non-captioned section formats. From the non-captioned sections corresponding respectively to the non-captioned section formats, the detector 16 detects, as the peripheral sections, the non-captioned sections that correspond respectively to the peripheral-section formats.

As has been described thus far, the peripheral sections are detected by using the broadcasting-program template stored in the memory 14. Thus, it is possible to detect the peripheral sections with higher accuracy, as compared with the case where a simple comparison is made between the length of each non-captioned section and the lengths of the peripheral sections.

In addition, since the peripheral sections are detected using the broadcasting-program template stored in the memory 14, the peripheral sections can be detected by removing the section corresponding to the opening-theme-section format.

Other Embodiments

Although the present invention has been described by way of the above-described embodiment, those descriptions and drawings that form parts of this disclosure should never be understood as limitations on the present invention. Those skilled in the art may conceive of various alternative embodiments, examples, and techniques to carry out the present invention.

For example, a program that causes a computer to execute the operation of the advertisement-section detecting apparatus 10 (i.e., the series of processes illustrated in FIG. 7 and in FIG. 8) may be provided.

Although not specially mentioned in the above-described embodiment, the memory 14 may store plural kinds of broadcasting-program templates corresponding respectively to different kinds of broadcasting-program formats (e.g. drama, variety show, and movie).

Although not specially mentioned in the above-described embodiment, the broadcasting-program template may be updated by the user.

In the above-described embodiment, the identifying unit 15 identifies, as non-captioned sections including peripheral sections, the non-captioned sections that are longer than the peripheral-section format. However, the embodiments are not limited to this way of identification. Specifically, the identifying unit 15 may identify, as non-captioned sections including peripheral sections, non-captioned sections each of which has a length that is approximately equal to the length of the peripheral-section format.

What is claimed is:

1. An advertisement-section detecting apparatus to detect a peripheral section on the basis of broadcast-data which corresponds to a broadcasting program including a main section and a peripheral section including an advertisement section, and which includes caption data, the advertisement-section detecting apparatus comprising:

a captioned-section acquisition unit configured to acquire a captioned section including a caption generated by the caption data, on the basis of a temporal position of the caption data;

a non-captioned-section acquisition unit configured to acquire a pattern of non-captioned sections that do not include the caption, on the basis of the captioned section;

a memory configured to store a broadcasting-program template, the broadcasting-program template being a template corresponding to a broadcasting-program format, the broadcasting-program format including a main-section format and a peripheral-section format, and the broadcasting-program template identifying a pattern of a non-captioned section format including the peripheral-section format;

an identifying unit configured to compare a length of one of the non-captioned sections in the pattern of non-captioned sections acquired by the non-captioned-section acquisition unit with a length of a section of the non-captioned section format of the broadcasting-program template, and to identify, when the length of the one of the non-captioned sections in the pattern of non-captioned sections acquired by the non-captioned-section acquisition unit is greater than the length of the section of the non-captioned section format of the broadcasting-program template, the non-captioned section corresponding to the non-captioned section format; and a detector configured to detect a section corresponding to the peripheral-section format as the peripheral section, from the non-captioned section corresponding to the non-captioned section format.

2. The advertisement-section detecting apparatus according to claim 1, wherein the pattern of the non-captioned sections is a pattern representing at least both an order of the non-captioned sections and the length of the non-captioned sections within the broadcasting program, and the pattern of the non-captioned section format is a pattern representing at least both the order of the non-captioned section format and the length of the non-captioned section format within the broadcasting-program format.

3. The advertisement-section detecting apparatus according to claim 1, wherein the main-section format includes a main-content main-section format and a main-content peripheral-section format, the non-captioned section format includes the main-content peripheral-section format in addition to the peripheral-section format, and the detector removes a section corresponding to the main-content peripheral-section format from the non-captioned section corresponding to the non-captioned section format, and thereby detects a section corresponding to the peripheral-section format as the peripheral section.

4. The advertisement-section detecting apparatus according to claim 1, wherein the captioned-section acquisition unit acquires a section having a narrower distance between temporal positions of adjacent pieces of the caption data than a predetermined threshold as the captioned section.

5. The advertisement-section detecting apparatus according to claim 1, wherein the captioned-section acquisition unit acquires a section having a predetermined length starting from temporal position of corresponding piece of the caption data as the captioned section.

6. The advertisement section detecting apparatus according to claim 1, wherein the detector is configured to detect, as the section, a section having a start corresponding to a start of the one of the caption sections in the pattern of non-captioned sections acquired by the non-captioned-section acquisition unit and having a length corresponding to the length of the section of the non-captioned section format of the broadcasting-program template.

7. An advertisement-section detecting program embodied on a non-transitory medium to detect peripheral section on the basis of broadcast-data which corresponds to a broadcasting program including a main section and a peripheral section including an advertisement section, and which includes caption data, the advertisement-section detecting program causing a computer to execute the steps of:

acquiring a captioned section including a caption generated by the caption data, on the basis of a temporal position of the caption data;

acquiring a pattern of non-captioned sections that do not include the caption, on the basis of the captioned section;

reading a broadcasting-program template, the broadcaseing-program template being a template corresponding to a broadcasting-program format, the broadcasting-program format including a main-section format and a peripheral-section format, and the broadcasting-program template identifying a pattern of a non-captioned section format including the peripheral-section format;

comparing a length of one of the non-captioned sections in the pattern of non-captioned sections acquired by the non-captioned-section acquisition unit with a length of a section of the non-captioned section format of the broadcasting-program template, and thereby identifying, when the length of the one of the non-captioned sections in the pattern of non-captioned sections acquired by the non-captioned-section acquisition unit is greater than the length of the section of the non-captioned section format of the broadcasting-program template, the non-captioned section corresponding to the non-captioned section format; and detecting a section corresponding to the peripheral-section format as the peripheral section, from the non-captioned section corresponding to the non-captioned section format.

8. The advertisement-section detecting program according to claim 7, wherein the pattern of the non-captioned sections is a pattern representing at least both an order of the non-captioned sections and the length of the non-captioned sections within the broadcasting program, and the pattern of the non-captioned section format is a pattern representing at least both the order of the non-captioned section format and the length of the non-captioned section format within the broadcasting-program format.

9. The advertisement-section detecting program according to claim 7, wherein the main-section format includes a main-content main-section format and a main-content peripheral-section format, the non-captioned section format includes the main-content peripheral-section format in addition to the peripheral-section format, and at the step of detecting, a section corresponding to the main-content peripheral-section format is removed from the non-captioned section corresponding to the non-captioned section format, and thereby a section corresponding to the peripheral-section format is detected as the peripheral section.

10. The advertisement-section detecting program according to claim 7, wherein at the step of acquiring a captioned section, a section having a narrower distance between temporal positions of adjacent pieces of the caption data than a predetermined threshold is acquired as the captioned section.

11. The advertisement-section detecting program according to claim 7, wherein at the step of acquiring a captioned section, a section having a predetermined length starting from temporal position of corresponding piece of the caption data is acquired as the captioned section.

* * * * *